United States Patent [19]

McGaughan et al.

[11] Patent Number: 5,760,132
[45] Date of Patent: Jun. 2, 1998

[54] COMPOSITIONS OF POLY(PHENYLENE ETHER) AND POLYAMIDE RESINS, WHICH EXHIBIT IMPROVED BEARD GROWTH REDUCTION

[75] Inventors: Neil Andrew McGaughan; Gim Fun Lee, Jr., both of Albany; Ronald James Wroczyski, Schenectady; John Bennie Yates, Glenmont, all of N.Y.; Christiaan Henricus J. Koevoets, Roosendaal; Jan P. Keulen, Ossendrecht, both of Netherlands; Jay Kumar Gianchandani, deceased, late of Loudonville, N.Y., by Mrs. Hardevi Gianchandane, Legal representative

[73] Assignee: General Electric Company, Pittsfield, Mass.

[21] Appl. No.: 472,105

[22] Filed: Jun. 7, 1995

[51] Int. Cl.⁶ .................................. C08L 71/12; C08L 77/00
[52] U.S. Cl. .................... 525/66; 525/92 B; 525/133; 525/151; 525/397
[58] Field of Search .................... 525/133, 397, 525/66, 92 B, 151

[56] References Cited

U.S. PATENT DOCUMENTS

| | | |
|---|---|---|
| 4,315,086 | 2/1982 | Ueno et al. . |
| 4,338,421 | 7/1982 | Maruyama et al. . |
| 4,600,741 | 7/1986 | Aycock et al. . |
| 4,642,358 | 2/1987 | Aycock et al. . |
| 4,654,405 | 3/1987 | Jalbert . |
| 4,659,760 | 4/1987 | van der Meer . |
| 4,728,693 | 3/1988 | Droscher et al. . |
| 4,743,651 | 5/1988 | Shibuya et al. . |
| 4,745,157 | 5/1988 | Yates, III et al. . |
| 4,755,566 | 7/1988 | Yates, III . |
| 4,760,115 | 7/1988 | Droescher et al. . |
| 4,772,664 | 9/1988 | Ueda et al. . |
| 4,792,586 | 12/1988 | Han . |
| 4,798,865 | 1/1989 | Grant et al. . |
| 4,822,836 | 4/1989 | Wroczynski . |
| 4,822,837 | 4/1989 | van der Meer . |
| 4,824,915 | 4/1989 | Aycock et al. . |
| 4,826,933 | 5/1989 | Grant et al. . |
| 4,839,425 | 6/1989 | Mawatari et al. . |
| 4,857,575 | 8/1989 | van der Meer et al. . |
| 4,859,739 | 8/1989 | Yates, III et al. . |
| 4,866,114 | 9/1989 | Taubitz et al. . |
| 4,873,286 | 10/1989 | Gallucci et al. . |
| 4,874,810 | 10/1989 | Lee, Jr. et al. . |
| 4,877,847 | 10/1989 | Masu et al. . |
| 4,885,334 | 12/1989 | Mayumi et al. . |
| 4,888,397 | 12/1989 | van der Meer et al. . |
| 4,889,889 | 12/1989 | Yates, III . |
| 4,923,924 | 5/1990 | Grant . |
| 4,929,675 | 5/1990 | Abe et al. . |
| 4,945,126 | 7/1990 | Crosby .................................. 525/146 |
| 4,957,965 | 9/1990 | Taubitz et al. . |
| 4,960,825 | 10/1990 | van der Meer . |
| 4,963,620 | 10/1990 | Grant et al. . |
| 4,968,749 | 11/1990 | Shibuya et al. . |
| 4,981,920 | 1/1991 | Terashima et al. . |
| 4,990,564 | 2/1991 | Taubitz et al. . |
| 5,000,897 | 3/1991 | Chambers . |
| 5,001,181 | 3/1991 | Takagi et al. . |
| 5,017,652 | 5/1991 | Abe et al. . |
| 5,017,663 | 5/1991 | Mizuno et al. . |
| 5,019,626 | 5/1991 | Taubitz et al. . |
| 5,026,787 | 6/1991 | Takagi et al. . |
| 5,039,746 | 8/1991 | Neugebauer et al. . |
| 5,041,504 | 8/1991 | Brown et al. . |
| 5,053,458 | 10/1991 | Taubitz et al. . |
| 5,055,494 | 10/1991 | van der Meer . |
| 5,069,818 | 12/1991 | Aycock et al. . |
| 5,070,151 | 12/1991 | Mizuno et al. . |
| 5,073,596 | 12/1991 | Inoue et al. . |
| 5,073,620 | 12/1991 | Sanada et al. . |
| 5,084,523 | 1/1992 | Neugrebauer et al. . |
| 5,086,105 | 2/1992 | Abe et al. . |
| 5,091,473 | 2/1992 | Arashiro et al. . |
| 5,096,979 | 3/1992 | Brown et al. . |
| 5,104,937 | 4/1992 | Saito .................................. 525/397 |
| 5,109,052 | 4/1992 | Kasai et al. . |
| 5,109,065 | 4/1992 | Saito et al. . |
| 5,112,907 | 5/1992 | Nishio et al. . |
| 5,115,010 | 5/1992 | Sakai et al. . |
| 5,115,044 | 5/1992 | Neugebauer . |
| 5,120,800 | 6/1992 | Tsukahara et al. . |

(List continued on next page.)

FOREIGN PATENT DOCUMENTS

| | | |
|---|---|---|
| 0-147-874-B1 | 10/1984 | European Pat. Off. . |
| 0-234-063-B1 | 12/1986 | European Pat. Off. . |
| 0-237-187-A1 | 2/1987 | European Pat. Off. . |
| 0-292-153-A2 | 5/1988 | European Pat. Off. . |
| 0-362-439-A1 | 8/1988 | European Pat. Off. . |
| 0-369-169-A1 | 10/1989 | European Pat. Off. . |
| 0-381-390-A2 | 1/1990 | European Pat. Off. . |
| 0-436-136-A1 | 12/1990 | European Pat. Off. . |
| 0-451-563-A2 | 3/1991 | European Pat. Off. . |
| 0-506-386-A2 | 3/1992 | European Pat. Off. . |
| 0-516-150-A1 | 5/1992 | European Pat. Off. . |
| 0-523-368-A1 | 6/1992 | European Pat. Off. . |
| 0-528-581-A1 | 8/1992 | European Pat. Off. . |
| 0-491-187-A1 | 11/1992 | European Pat. Off. . |
| 0-549-268-A2 | 12/1992 | European Pat. Off. . |
| 0-550-206-A2 | 12/1992 | European Pat. Off. . |
| 0-559-485-A1 | 3/1993 | European Pat. Off. . |
| 0 602 945 A1 | 6/1994 | European Pat. Off. . |
| 4-39354 | 2/1992 | Japan . |
| 4-88058 | 3/1992 | Japan . |
| 4-198354 | 7/1992 | Japan . |
| 4-202256 | 7/1992 | Japan . |
| 88/06173 | 8/1988 | WIPO . |
| WO 88/06167 | 8/1988 | WIPO . |
| WO 93/13251 | 7/1993 | WIPO . |

*Primary Examiner*—David Buttner

[57] ABSTRACT

Improved thermoplastic compositions that are resistant to die beard growth are described herein, comprising poly(phenylene ether) resins, polyamide resins and an amount of a beard growth reducing agent selected from the group consisting of non-elastomeric polyolefin resins, partially fluorinated polyolefins, and mixtures of non-elastomeric polyolefin resins and partially fluorinated polyolefins, effective for inhibiting beard growth. The compositions may further comprise at least one impact modifier, flow promotor or filler.

28 Claims, No Drawings

U.S. PATENT DOCUMENTS

| | | |
|---|---|---|
| 5,120,801 | 6/1992 | Chambers . |
| 5,122,575 | 6/1992 | White et al. . |
| 5,124,391 | 6/1992 | Muehlbach et al. . |
| 5,134,196 | 7/1992 | van der Meer . |
| 5,145,904 | 9/1992 | Muehlbach et al. . |
| 5,147,942 | 9/1992 | Abe et al. . |
| 5,153,266 | 10/1992 | Muehlbach et al. . |
| 5,159,008 | 10/1992 | Nishida et al. . |
| 5,159,018 | 10/1992 | Nishio et al. . |
| 5,159,075 | 10/1992 | Phanstiel et al. . |
| 5,162,433 | 11/1992 | Nishio et al. . |
| 5,162,440 | 11/1992 | Akkepeddi et al. . |
| 5,162,447 | 11/1992 | Abe et al. . |
| 5,166,237 | 11/1992 | Abe et al. . |
| 5,175,211 | 12/1992 | Sanada et al. . |
| 5,182,336 | 1/1993 | Abe et al. . |
| 5,210,125 | 5/1993 | Pernice et al. . |
| 5,212,256 | 5/1993 | Mizuno et al. . |
| 5,225,270 | 7/1993 | Bhoori et al. . |
| 5,237,002 | 8/1993 | Nishio et al. . |
| 5,244,973 | 9/1993 | Sakazume et al. . |
| 5,248,728 | 9/1993 | Lee, Jr. et al. . |
| 5,262,478 | 11/1993 | Nishio et al. . |
| 5,266,673 | 11/1993 | Tsukahara et al. . |
| 5,288,786 | 2/1994 | Nishio et al. . |
| 5,296,533 | 3/1994 | Nagaoka et al. . |
| 5,310,821 | 5/1994 | Kodaira et al. . |
| 5,331,060 | 7/1994 | Aycock et al. . |
| 5,336,732 | 8/1994 | Samuels . |
| 5,378,750 | 1/1995 | Sayed et al. . |
| 5,449,721 | 9/1995 | Suzuki et al. . |
| 5,554,677 | 9/1996 | Nagaoka .................................. 525/397 |

COMPOSITIONS OF POLY(PHENYLENE ETHER) AND POLYAMIDE RESINS, WHICH EXHIBIT IMPROVED BEARD GROWTH REDUCTION

BACKGROUND OF THE INVENTION

This invention relates to poly(phenylene ether)-polyamide resin compositions which exhibit enhanced properties, such as reduction of die beard growth.

Poly(phenylene ether) resins (referred to hereafter as "PPE") are commercially attractive materials because of their unique combination of physical, chemical, and electrical properties. Furthermore, the combination of these resins with polyamide resins into compatibilized blends results in additional overall properties such as chemical resistance, high strength and high flow. Examples of such compatibilized blends can be found in U.S. Pat. Nos. 4,315,086 (Ueno, et al); 4,659,760 (van der Meer); and 4,732,938 (Grant, et al). The properties of these blends can be further enhanced by the addition of various additives such as impact modifiers, flame retardants, light stabilizers, processing stabilizers, heat stabilizers, antioxidants and fillers.

PPE-polyamide blends can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

As the compounded material exits the die of the extruder, a small buildup of material forms on the die at the exit holes. The material buildup is commonly referred to as "die beard growth." Over time the beard growth accumulates at the die holes and requires that the extruder operator periodically wipe the die clean in order to avoid having the beard growth material end up with the final product. This cleaning step is burdensome and time consuming and reduces the productivity of the manufacturing process. Moreover the quality of the PPE-polyamide blend product is negatively affected due to some contamination from the beard growth that inevitably ends up with the final packaged product.

It is therefore apparent that a need exists for PPE-polyamide compositions that have a reduction in beard growth and which do not substantially detract from other important properties, such as impact and tensile strength.

SUMMARY OF THE INVENTION

The needs discussed above have been generally satisfied by the discovery of an improved thermoplastic composition which comprises:

a) a poly(phenylene ether) resin;
b) a polyamide resin; and
c) an amount of a beard growth reducing agent selected from the group consisting of non-elastomeric polyolefin resins, partially fluorinated polyolefin resins, and mixtures of non-elastomeric polyolefin resins and partially fluorinated polyolefin resins, effective for inhibiting beard growth.

The description which follows provides further details regarding this invention.

DETAILED DESCRIPTION OF THE INVENTION

The PPE employed in the present invention are known polymers comprising a plurality of structural units of the formula (I):

wherein for each structural unit independently, each $Q^1$ is independently halogen, primary or secondary lower alkyl (i.e., alkyl containing up to about 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average monocular weight within the range of about 3,000–40,000 and a weight average molecular weight within the range of about 20,000–80,000, as determined by gel permeation chromatography. The PPE have an intrinsic viscosity most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

It is preferable for at least some of the PPE to be a "compatibilizing PPE." Appropriate compatibilizng PPE's are those which affect the compatibility of the PPE with the various components of the blend. Compatibility is meant to include the minimization of gross phase separation between the components of the blend (i.e., the PPE and the polyamide). Indicators of improved compatibilization include, for example, increased tensile elongation, reduced delamination tendency, increased ductility and improved phase morphology stabilization. It is through the effect of improving the compatibilization between the blend components which determines, in part, the desirable physical properties of the blend.

One way to prepare a compatibilizing PPE is to functionalize the PPE by reacting the PPE with at least one compound having both:

(i) a carbon-carbon double bond or a carbon-carbon triple bond and (ii) a carboxylic acid, acid anhydride, acid amide, imido, carboxylic acid ester, epoxy, amino, hydroxyl or carboxylic acid ammonium salt.

These compounds are sometimes referred to as compatibilizers or functionalizers and the resultant PPE's are commonly referred to as compatibilizing PPE or functionalized PPE. Typical compounds used to accomplish the functionalization include: maleic anhydride, fumaric acid, maleimides such as N-phenylmaleimide and 1,4-phenylene-bis-methylene-α,α'-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Such typical reagents for preparing a useful functionalized polyphenylene ether are described in U.S. Pat. Nos. 4,315,086, 4,755,566, and 4,888,397, which are incorporated herein by reference.

Non-polymeric aliphatic polycarboxylic acids are also useful for preparing an appropriate compatibilizing PPE. Included in the group of species, also known as compatibilizers or functionalizers, are the aliphatic polycarboxylic acids, acid esters and acid amides represented by the formula (II):

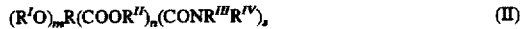

$(R'O)_mR(COOR'')_n(CONR'''R^{IV})_s$      (II)

wherein R is a linear or branched chain, saturated aliphatic hydrocarbon of from 2 to about 20, preferably 2 to 10, carbon atoms; R' is selected from the group consisting of hydrogen or an alkyl, aryl, acyl or carbonyl dioxy group of 1 to about 10, preferably 1 to 6, most preferably 1 to 4, carbon atoms, especially preferred is hydrogen; each R'', is independently selected from the group consisting of hydrogen or an alkyl or aryl group of from 1 to about 20 carbon atoms preferably from 1 to 10 carbon atoms; each R''' and $R^{IV}$ is independently selected from the group consisting essentially of hydrogen or an alkyl or aryl group of from 1 to about 10, preferably from 1 to 6, most preferably 1 to 4, carbon atoms; m is equal to 1 and (n+s) is greater than or equal to 2, preferably equal to 2 or 3, and n and s are each greater than or equal to zero and wherein (OR') is alpha or beta to a carbonyl group and at least two carbonyl groups are separated by 2 to 6 carbon atoms. Obviously, R', R'', R''' and $R^{IV}$ cannot be aryl when the respective substituent has less than 6 carbon atoms.

Illustrative of suitable polycarboxylic acids are citric acid, malic acid, and agarcic acid; including the various commercial forms thereof, such as, for example, the anhydrous and hydrated acids. Illustrative of acid esters useful herein include, for example, acetyl citrate and mono- and/or distearyl citrates and the like. Suitable acid amides useful herein include for example N,N'- diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Suitable functionalizing compounds can be found in U.S. Pat. Nos. 4,315,086, 4,755,566 and 5,000,897, which are incorporated herein by reference.

The amount of the above mentioned compatibilizers that is required to appropriately functionalize the PPE is that which is sufficient to improve the compatibility between the various components in the composition. It is thought that reactions can occur between some of the components of the composition, for example, between the compatibilizing PPE and the polyamide resin which results in the formation of PPE-nylon copolymers. An effective amount of the above mentioned compatibilizers is generally up to about 8% by weight, and is preferably from about 0.05% to about 4% by weight; based on the amount of the PPE. In the most preferred embodiments, the amount of the compatibilizer is in the range of about 0.1% to about 3% by weight based on the amount of the PPE.

Another useful method for preparing an appropriate compatibilizing PPE resin involves reacting a PPE resin with a compound containing an acyl functional group. Non-limiting examples include chloroformyl succinic anhydride, chloroethanoyl succinic anhydride, trimellitic anhydride acid chloride, 1-acetoxy-acetyl-3,4-dibenzoic acid anhydride, and terephthalic acid acid chloride. Additional examples and methods to prepare such functionalized PPE can be found in U.S. Pat. Nos. 4,600,741 and 4,642,358, each of which is incorporated herein by reference.

Various chloroepoxytriazine compounds are also useful for preparing an appropriate compatibilizing PPE resin. Illustrative compounds of this type include 2-chloro-4,6-diglycidoxy-1,3,5-triazine; 2-chloro-4-(n-butoxy)-6-glycidoxy-1,3,5-triazine; and 2-chloro4-(2,4,6-trimethylphenoxy)-6-glycidoxy-1,3,5-triazine, also known as mesityl glycidyl chlorocyanurate (MGCC.). Methods to prepare these compounds and functionalized PPE resins can be found in U.S. Pat. Nos. 4,895,945, 5,041,504, 5,089,566 and 5,096,979, all of which are incorporated herein by reference.

Polyamides, also known as nylons, which can be used in the present invention include any polyamides and polyamide copolymers known in the art. Included are those polyamides prepared by the polymerization of monomers selected from the following group:

(i) monoamino-monocarboxylic acids having at least 2 carbon atoms between the amino and carboxylic acid group;

(ii) cyclic or lactam structures of (i);

(iii) substantially equimolar proportions of a diamine which contains at least 2 carbon atoms between the amino groups and a dicarboxylic acid; and (iv) various combinations of monoaminocarboxylic acids, lactams, diamines and dicarboxylic acids.

The term "substantially equimolar" proportions includes both strictly equimolar proportions and slight departures therefrom which are involved in conventional techniques for stabilizing the viscosity of the resultant polyamides. The balance of the monomer proportions can also be adjusted so as to control the acid to amine endgroup ratio. The dicarboxylic acid may be used in the form of a functional derivative thereof, for example, an ester or acid chloride.

Examples of the aforementioned monoamino monocarboxylic acids or lactams thereof which are useful in preparing the polyamides include those compounds containing from 2 to about 16 carbon atoms between the amino and carboxylic acid groups, said carbon atoms forming a ring containing the —CO—NH— group in the case of lactam. As particular examples of a monocarboxylic acids and lactams there may be mentioned ε-aminocaproic acid, butyrolactam, pivalolactam, ε-caprolactam, capryllactam, enentholactam, undecanolactam, dodecanolactam and 3- and 4- aminobenzoic acids.

Diamines suitable for use in the preparation of the polyamides include the straight chain and branched chain alkyl, aryl, and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylendiamine, and m-xylylenediamine. Monomers which have more than two amino groups can also be utilized to make various branched polyamide materials.

The dicarboxylic acids may be represented by the following formula (III):

wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Monomers which have more than two carboxylic acid groups can also be utilized to make various branched polyamide materials.

Polyamides suitable for use in the present invention may be made by any known method. The polyamides can have linear or branched structures or be mixtures of linear and branched structures. They preferably contain a substantial proportion of amine end groups. Polyamides in which the amine end group concentration is at least about 40 meq./g. are particularly useful. In many instances, it is preferred that the amine to acid endgroup ratio to be about 1 or greater than 1. It is also within the scope of the invention, however, to employ predominantly carboxylic acid-terminated polyamides.

Both crystalline and amorphous polyamides may be employed, with the crystalline species often being preferred by reason of their solvent resistance. Typical examples of the polyamides include, for example, nylon-6 (polycaprolactam), nylon-6,6 (polyhexamethylene adipamide), nylon-11, nylon-12, nylon-6,3, nylon-6,4, nylon-6,10, and nylon-6,12 as well as polyamides from terephthalic acid, isophthalic acid, or mixtures of terephthalic acid and isophthalic acid, and trimethylhexamethylenediamine; from adipic acid and m-xylylenediamines; from adipic acid, azelaic acid and 2,2 bis(p-aminophenyl)propane or 2,2-bis-(p-aminocyclohexyl)propane and from terephthalic acid and 4,4' diaminodicyclohexylmethane. Mixtures and/or copolymers of two or more of the foregoing polyamides or prepolymers thereof, respectively, are also within the scope of the present invention. Preferred polyamides are nylon-6, nylon-4,6, nylon-6,6, nylon-11, and nylon-12, most preferably nylon-6,6 and nylon-6.

The weight ratio of PPE to polyamide may vary from about 20:80 to about 70:30, with a ratio of about 40:60 to 60:40 being preferred.

The beard growth reducing agent for the present invention is selected from the group consisting of non-elastomeric polyolefin resins, partially fluorinated polyolefin resins, and mixtures of non-elastomeric polyolefin resins and partially fluorinated polyolefin resins, effective for inhibiting beard growth.

The beard growth resistant non-elastomeric polyolefin resins which can be used in the present invention include homopolymers of an α-olefin having a straight or branched chain or alicyclic structure such as ethylene, propylene, butene-1, pentene-1, hexene-1, 3-methylbutene-1, 4-methylpentene-1, heptene-1, octene-1, vinylcyclohexane, vinylcyclopentane, etc.; random, block, graft or other copolymers of two or more comonomers selected from among these α-olefins; random, block, graft or other copolymers comprising at least one of the above-described α-olefins as a major component and at least one of other unsaturated comonomers; and oxidation, halogenation or sulfonation products of these polymers. These polyolefinic resins show crystallinity at least partly.

The polyolefinic resin is typically a copolymer made from at least 65% ethylene monomer with at least one olefinic monomer of the following structure (IV):

wherein $R_1$ is selected from the group consisting of a $C_{1-10}$ alkylene radical and a radical of the following structure (V):

wherein $R_2$ is selected from the group consisting of a $C_{1-10}$ alkylene radical, a $C_{6-10}$ alicyclic radical, and a $C_{6-20}$ aromatic radical.

Examples of the aforesaid unsaturated comonomers include unsaturated organic acids or derivatives thereof, e.g., acrylic acid, methacrylic acid, maleic acid, itaconic acid, methyl acrylate, ethyl acrylate, methyl methacrylate, butyl acrylate, maleic anhydride, an arylmaleicimide, and alkylmaleicimide, etc.; vinyl esters, e.g., vinyl acetate, vinyl butyrate, etc.; aromatic vinyl compounds, e.g., styrene, methylstyrene, etc.; vinylsilanes, e.g., vinyltrimethylmethoxysilane, γ-methacryloyloxypropyltrimethoxysilane, etc.; and non-conjugated dienes, e.g., dicyclopentadiene, 4-ethylidene-2-norbornene, 4-methyl-1,4-hexadiene, 5-methyl-1,4-hexadiene, etc.

The polyolefinic resins can be prepared by polymerization or modification according to known processes. Any of the commercially available polyolefinic resins may be utilized. These polyolefinic based resins may be used either individually or in combinations thereof.

Preferred among them are homopolymers of ethylene and copolymers comprising at least one of the α-olefins and are referred to in the present specification by the term polyethylene resins.

The polyethylene resins may be obtained from those having lower molecular weight or higher molecular weight by inducing a molecular weight change through a known manner, for example, heat treatment in the presence or absence of a radical generator (e.g., organic or inorganic peroxides, organic tin compounds, organic azo compounds, etc.), heating or mechanical shearing during melt-kneading, or the like technique.

The preferred proportion of the non-ethylene monomer in the polyethylene resins is at least 1% by weight from the standpoint of attaining acceptable impact strength and up to about 35% by weight from the standpoint of taking advantages of the characteristics possessed by the polyethylene resins. The non-ethylene monomer content preferably ranges from about 5% to about 25% by weight and the resulting polyethylene resins typically have densities from about 0.88 g/cc to about 0.97 g/cc. Higher levels of comonomers, for example propylene, results in the formation of rubbery or elastomeric-type materials such as ethylene-propylene rubber (EPR). These materials typically have densities under 0.88 g/cc. Elastomers are generally characterized as polymeric materials that can rapidly recover their shape after removal of a strain of at least 50%. Polyethylene resins having less than about 35% by weight comonomer generally do not possess such elastomeric properties and are considered non-elastomeric polyethylene resins. The copolymerization ratio of the non-ethylene copolymer in the polyethylene resins, can generally be determined by NMR analysis or infared spectroscopic analysis.

Preferred non-elastomeric polyethylene resins for the present invention include low density polyethylene (LDPE), linear low density polyethylene (LLDPE), high density polyethylene (HDPE), medium density polyethylene (MDPE), as well as copolymers of ethylene and organic esters such as, for example, polyethylene methyl acrylate (EMA) and polyethylene ethyl acrylate (EEA). The resulting final properties of the final composition will vary depending upon the particular polyolefin utilized. These preferred non-elastomeric polyethylene resins are commercially available from Union Carbide as LLDPE and include grades GR7047 and GR8320 and also under the trademark FLEXOMER® and include DFDA 1137, DFDA 1138, DEFD 9042, and GERS 1085. Polyethylene methyl acrylate is commercially available from Chevron Oil Company as PE2205, which contains about 18% by weight methyl acrylate.

The non-elastomeric polyethylene resin is generally present in an amount from about 0.5% to about 20% by weight based on the total weight of the composition. The preferred range is about 1% to about 15% and is most preferable in the range of about 1% to about 5% by weight based on the total weight of the entire composition, including any additives.

The partially fluorinated polyolefin resins include, but are not limited to, poly(vinylidene fluoride), poly(vinyl fluoride), poly(trifluoroethylene), poly (chlorotrifluoroethylene) and poly(trifluoroethylene alkali metal sulfonate).

The fluorinated polyolefins which are most useful in the present invention, as well as methods for their preparation, are described inter alia in Billmeyer, Fred W., Jr. Textbook of Polymer Science, Interscience Publishers, New York, N.Y., 1966, pp. 425–427; Monermoso, J. C., Rubber Chem. Tech., 34, 1521 (1961); and Rudner, M. A. Fluorocarbons, Reinhold Publishing Corp., New York, N.Y., and U.S. Pat. No. 4,663,391, which is incorporated herein by reference.

The polytetrafluoroethylene (PTFE) resin is a useful fluorinated polyolefin resin in the present invention. A preferable partially fluorinated polyolefin resin is a copolymer of 1-propene, 1,1,2,3,3,3-hexafluoropolymer with 1,1-difluoroethane. Especially preferred is a concentrate comprising about 90 weight % of the above described fluorocopolymer in about 6 weight % talc with about 2 weight % amorphous silicone dioxide and about 2 weight % carbonic acid calcium salt obtained from Minnesota, Mining and Minerals, Co. (3M) under the trademark DYNAMAR FX9613. Other fluoropolymers and concentrates are also useful for producing reduced beard growth compositions. Typical levels for the fluoropolymer are between about 10 to 5000 ppm by weight based on the total weight of the composition with a preferred range between about 200 and 1000 ppm based on the total weight of the composition.

In order to provide an even dispersion of the partially fluorinated polyolefins within the PPE-polyamide composition, a masterbatch of the partially fluorinated polyolefins in a second polymer resin is preferred. Generally, the masterbatch will comprise from about 1 to about 15 weight percent, preferably from about 1–8 weight percent, of the partially fluorinated polyolefin in the matrix resin. The matrix resin can comprise most any thermoplastic resin, however, for PPE-polyamide blends, polyamide and the non-elastomeric polyolefin resin are especially useful as the matrix component for the masterbatch.

The compositions of the present invention may also contain at least one impact modifier. The preferred impact modifiers are block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are commercially available from Shell Chemical Company under the trademark KRATON, and include KRATON D1101, D1102, G1650, G1651, G1652, G1701 and G1702.

The amount of the impact modifier generally present, when one is used, is in the range of about 1% to about 15% by weight based on the total weight of the composition. The preferred range is about 1% to about 12% and the most preferred range is about 3% to about 8% by weight; based on the total weight of the composition.

The compositions of the present invention may also contain a flow promoter, for example, at least one polymer of an alkenylaromatic compound. Suitable polymers of this type may be prepared by methods known in the art including bulk, suspension and emulsion polymerization. They generally contain at least 25% by weight of structural units derived from an alkenylaromatic monomer of the formula (VI):

wherein $R^5$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS).

The amount of the flow promotor present, when one is used, is in the range of about 0.01% to about 20% by weight based on the total weight of the composition. The preferred range is about 0.01% to about 15% by weight and the most preferred range is about 0.1% to about 12% by weight; based on the total weight of the composition.

Compositions of the present invention can also include effective amounts of at least one additive selected from the group consisting of flame retardants, drip retardants, dyes, pigments, colorants, re-inforcing agents, fillers, glass fibers, stabilizers, antistatic agents, plasticizers and lubricants. These additives are known in the art, as are their effective levels and methods of incorporation. Effective amounts of the additives vary widely, but they are usually present in an amount from about 0.1% to 50% by weight, based on the weight of the entire composition.

The preparation of the compositions of the present invention is normally achieved by merely blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition.

All of the ingredients may be added initially to the processing system, or else certain additives may be precompounded with each other or with one of the primary polymer components, PPE and polyamide. It appears that certain properties, such as impact strength and elongation, are sometimes enhanced by initially precompounding the PPE with at least one of the typical agents used to functionalize PPE prior to blending with the polyamide. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition, without undue experimentation.

It should also be clear that improved molded articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated and all parts are parts by weight.

EXAMPLES

Generally test compositions were extruded on a Werner-Pfleiderer twin-screw extruder at a temperature of about 290°–300° C. with a vacuum of 10–20 inches Hg applied to the melt during compounding. The resultant compositions were molded using a Toshiba injection molding machine using a temperature set of about 290°–300° C. and a mold temperature of about 75° C. Samples of the compositions were subjected to measurement of notched Izod impact strength according to ASTM D256 (employing a sample size of 2.5 inch by 0.5 inch by 0.125 inch), Dynatup (energy to fracture; falling dart test) strength according to ASTM D3763 (using 4 inch diameter by 0.125 inch disks), flexural modulus and flexural strength according to ASTM D790 (employing a samples size of 6 inch by 0.5 inch by 0.25 inch), and tensile yield and tensile elongation at break according to ASTM D638. Beard growth observance was done via visual inspection of the die of the extruder during compounding of the sample formulations. For selected samples, beard growth was also measured as function of the time in seconds that it takes for a beard to grow to sufficient size to stick to the extruding strand. This time is referred to "$T_2$" time and an increase in $T_2$ time is desireable.

TABLE 1

| Composition: 50 parts PPE, 0.7 parts citric acid monohydrate, 45 parts nylon-6,6, 5 parts FLEXOMER ® | | | | | |
|---|---|---|---|---|---|
| Sample No. (FLEXOMER grade) | N.I. | Dynatup | ten. str. | te | BG |
| 1 control (no FLEXOMER) | 2.8 | 45 | 9706 | 58 | yes |
| 2 (DEFD9042) | 2.7 | 45 | 9399 | 60 | no |
| 3 (DFDA1138) | 1.9 | 35 | 9664 | 44 | no |
| 4 (DFDA1137) | 2.8 | 45 | 9630 | 60 | no |
| 5 (GERS1085) | 2.4 | 45 | 9527 | 68 | no |

N.I. is notched Izod @ 73° F. reported in ft-lb/in; Dynatup impact @ 73° F. reported in ft-lbs; ten. str. is tensile strength at yield @ 73° F. reported in psi; te is tensile elongation at break @ 73° F. reported in percent; BG is beard growth observance.

The physical property data of the illustrative samples for PPE/nylon-6,6 blends in Table 1 show the surprisingly good retention of physical properties, especially impact properties, and decrease in beard growth for compositions containing the non-elastomeric polyolefin resin when compared to a control (sample 1) containing 5 parts of a block copolymer (Kraton® D-1102) without a non-elastomeric polyolefin resin. The block copolymer of styrene and butadiene is typical of those utilized as impact modifiers for PPE-polyamide blends. Comparison of examples 1 and 4 further demonstrates the unexpected result that the non-elastomeric polyolefin can replace the block copolymer and retain desirable physical properties (especially impact and tensile) while inhibiting the beard growth.

TABLE 2

| Composition: 55 parts PPE, 0.7 parts citric acid monohydrate, 40 parts nylon-6, 5 parts polyolefin. Compositions additionally comprise: 0.05 parts copper (I) iodide, 0.1 parts potassium iodide and 0.3 parts Irganox 1076 hindered phenol. | | | | | |
|---|---|---|---|---|---|
| Sample No. (polyolefin type) | N.I. | Dynatup 73° F.; –22° F. | Tensile str. | tensile elong. | BG |
| 6 (none-control) | 1.1 | 2; 1 | 8200 | 38 | no |
| 7 (EMA) | 1.7 | 53; 46 | 4800 | 55 | no |
| 8 (DFDA1137) | 2.1 | 47; 16 | 7900 | 91 | no |
| 9 (LLDPE-#1) | 1.3 | 49; 52 | 7800 | 62 | no |
| 10 (LLDPE-#2) | 1.7 | 47; 50 | 8200 | 151 | no |

EMA was PE2205 from Chevron Oil; DFDA1137 was Flexomer® DFDA1137 from Union Carbide; LLDPE-#1 was GR8320 and LLDPE #2 was GR7047 both from Union Carbide. N.I. is notched Izod @ 73° F. reported in ft-lb/in; Dynatup impact was measured at 73° F. and –22° F. and is reported in ft-lbs; tensile. str. is tensile strength at yield @ 73° F. reported in psi; tensile elong. is tensile elongation at break @ 73° F. reported in percent; BG is beard growth observance.

The physical property data of the illustrative samples for PPE/nylon-6 blends in Table 2 show the good physical properties obtained, especially Dynatup impact properties, and absence of beard growth for compositions containing the various non-elastomeric polyolefin resins when compared to a control (sample 6) containing no impact modifying block copolymer, such as the one used in sample 1 of Table 1. Although sample 6 (control) had no observable beard growth, the Dynatup impact properties are vastly inferior to the comparative samples of the present invention containing the non-elastomeric polyethylene. Dynatup impact properties as low as those of sample 6 would be unacceptable for many commercial applications.

TABLE 3

Composition: 55 parts PPE, 0.6 parts citric acid monohydrate, 40 parts nylon-6, 5 parts polyolefin. Compositions further comprise: 0.05 parts copper (I) iodide, 0.1 parts potassium iodide and 0.3 parts Irganox 1076 hindered phenol.

| sample no. | N.I. | Dynatup 73° F. | Dynatup −22° F. | Tensile str. | Tensile elong. | BG |
|---|---|---|---|---|---|---|
| 11 (control) | 1.0 | 3 | 2 | 8300 | 62 | yes |
| 12 (2 parts LLDPE-#1) | 1.2 | 45 | 12 | 8100 | 110 | no |
| 13 (5 parts LLDPE-#1) | 1.8 | 46 | 21 | 7800 | 50 | no |

LLDPE-#1 was linear low density polyethylene GR8320 from Union Carbide. N.I. is notched Izod @ 73° F. reported in ft-lb/in; Dynatup impact was measured at 73° F. and −22° F. and is reported in ft-lbs; tensile str. is tensile strength at yield @ 73° F. reported in psi; tensile elong. is tensile elongation at break @ 73° F. reported in percent; BG is beard growth observance.

The physical property data of the illustrative samples for PPE/nylon-6 blends in Table 3 show the surprising good physical properties, especially Dynatup impact properties, even at relatively low levels of linear low density polyethylene resin and absence of beard growth when compared to a control containing no block copolymer (sample 11).

TABLE 4

| | Sample number | | | |
|---|---|---|---|---|
| Composition: | 14 | 15 | 16 | 17 |
| PPE | 50 | 50 | 36 | 36 |
| nylon-6,6 | 40 | 40 | 39 | 39 |
| Kraton D1102 | 10 | 10 | 9 | 9 |
| EMA | 0 | 3 | 0 | 3 |
| CAH | 0.7 | 0.7 | 1.0 | 1.0 |
| notched Izod | 4.7 | 0.7 | 1.0 | 1.0 |
| Dynatup 73° F. | 42 DB | 44 D | 42 DB | 48 D |
| −22° F. | 30 B | 33 B | 32 B | 36 B |
| tensile str. | 9000 | 8800 | 9000 | 8300 |
| tensile elong. | 61 | 36 | 35 | 42 |
| BG | yes | no | yes | no |

EMA was PE2205 from Chevron Oil; n. Izod is notched Izod @ 73° F. reported in ft-lb/in; Dynatup impact was measured at 73 and −22° F. and is reported in ft-lbs, D refers to a ductile break, DB refers to a ductile-brittle break and B refers to a brittle break; tensile str. is tensile strength at yield @ 73° F. reported in psi; tensile elong. is tensile elongation at break @ 73° F. reported in percent; BG is beard growth observance.

The physical property data of the illustrative samples for PPE/nylon-6,6 blends in Table 4 show the surprising improvement in physical properties, especially Dynatup impact properties, and absence of beard growth for a combination of a block copolymer and a non-elastomeric polyolefin copolymer (EMA in these examples) when compared to controls containing only a block copolymer (samples 14 and 16). The block copolymer used in these samples was a polystyrene-polybutadiene-polystyrene copolymer of the type typical of those used as an impact modifier for the PPE-polyamide blends. It was unanticipated that the PPE-polyamide blend comprising the non-elastomeric polyolefin resin in combination with the block copolymer would remain resistant to beard growth formation (e.g., sample 15 compared to sample 14 and sample 17 compared to sample 16).

TABLE 5 composition (in parts by weight): 48 PPE; 1 citric acid; 10 D-1102; 41 nylon-6,6; variable LDPE

| sample | LDPE amount | $T_2$ (seconds) |
|---|---|---|
| 18 | 0 (control) | 223 |
| 19 | 0.5 | 253 |
| 20 | 1.0 | 340 |
| 21 | 2.0 | 400 |
| 22 | 5.0 | 472 |

The data in Table 5 provide a quantitative measure of the surprizing improvement in beard growth reduction in PPE-polyamide blends with even relatively small amount of a non-elastomeric polyolefin resin. The other physical properties remained acceptable at loadings through this range.

TABLE 6 composition (in parts by weight): 48 PPE; 1 citric acid; 10 D-1102; 41 nylon-6,6; variable beard growth reducing agent

| sample | beard growth reducing agent | $T_2$ (seconds) | Dynatup (Joules) |
|---|---|---|---|
| 23 | 0 (control) | 275 | 85 |
| 24 | 2.0 LDPE - upstream | 650 | 105 |
| 25 | 1.0 (PTFE/PA 6,6)[1] - upstream | 455 | 90 |
| 26 | 1.0 (PTFE/PA 6,6) - downstream | 610 | 110 |
| 27 | 2.4 (PTFE/LDPE)[2] - upstream | 1375 | 115 |

(PTFE/PA 6,6)[1] is a 5 weight % DYNAMAR FX9613 concentrate in polyamide 6,6; (PTFE/LDPE)[2] is a 2.05 weight % DYNAMAR FX9613 concentrate in LDPE. The loadings of the concentrates provide approximately 500 ppm of partially fluorinated polyolefins based on the total weight of the composition.

The data in Table 6 compare the beneficial effects of a non-elastomeric polyolefin resin to a partially fluorinated polyolefin to a blend of non-elastomeric polyolefin resin and a partially fluorinated polyolefin. In addition to the improvement in beard growth, the falling dart impact strength measured at room temperature increased with the addition of the beard growth reducing agents.

Many variations may suggest themselves to those skilled in the art from the above detailed descriptions without departing from the scope or spirit of the invention. It is, therefore, to be understood that changes may be made in the particular embodiments of the invention as defined by the appended claims.

What is claimed:
1. A composition comprising:
   a) a poly(phenylene ether) resin;
   b) a polyamide resin; and
   c) an amount of a beard growth reducing agent selected from the group consisting of partially fluorinated polyolefin resins, and mixtures of non-elastomeric polyolefin resins and partially fluorinated polyolefin resins, effective for inhibiting beard growth, wherein the amount of partially fluorinated polyolefin resins is between about 200 and 1000 ppm based on the total weight of the composition and the amount of non-elastomeric polyolefin resins is between about 0% to about 5% based on the total weight of the composition.
2. The composition of claim 1, wherein the poly (phenylene ether) resin comprises a compatibilizing poly (phenylene ether) resin.
3. The composition of claim 2, wherein the compatibilizing poly(phenylene ether) resin comprises a poly(phenylene ether) resin and at least one compatibilizing agent selected from the group consisting of
(a) non-polymeric polycarboxylic acids; and
(b) compounds having both:
(i) a carbon-carbon double bond or a carbon-carbon triple bond; and
(ii) a carboxylic acid, acid anhydride, acid amide, imido, carboxylic acid ester, epoxy, amino, hydroxyl or carboxylic acid ammonium salt.

4. The composition of claim 3, wherein the compatibilizing agent is present from about 0.1% to about 8% by weight based on the weight of the poly(phenylene ether) resin.

5. The composition of claim 4, wherein the compatibilizing agent is selected from the group consisting of citric acid, fumaric acid and maleic anhydride.

6. The composition of claim 2, wherein the compatibilizing poly(phenylene ether) resin comprises a poly(phenylene ether) resin functionalized with a species selected from the group consisting of amino, hydroxy, carboxylic acid, epoxy and anhydride.

7. The composition of claim 6, wherein the compatibilizing poly(phenylene ether) resin is a poly(phenylene ether) resin functionalized with a species selected from the group consisting of a chloroepoxytriazine compound and trimellitic anhydride acid chloride.

8. The composition of claim 1, wherein the non-elastomeric polyolefin resin is a polyethylene resin.

9. The composition of claim 8, wherein the polyethylene resin is a copolymer made from at least 65% ethylene monomer with at least one olefinic monomer of the following structure:

wherein $R_1$ is selected from the group consisting of $C_{1-10}$ alkylene radicals and a radical of the following structure:

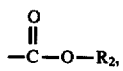

wherein $R_2$ is selected from the group consisting of a $C_{1-10}$ alkylene radical, a $C_{6-10}$ alicyclic radical, and a $C_{6-20}$ aromatic radical.

10. The composition of claim 9, wherein the polyethylene resin is a copolymer made from at least 65% ethylene monomer and at least one additional monomer selected from the group consisting of propylene, butylene, hexene-1, methyl acrylate, ethyl acrylate and butyl acrylate.

11. The composition of claim 1, wherein the partially fluorinated polyolefin resins are in a masterbatch of a second resin.

12. The composition of claim 1, wherein:
the weight ratio of the poly(phenylene ether) resin to the polyamide resin is from about 20:80 to about 70:30.

13. The composition of claim 1, further comprising an impact modifier.

14. The composition of claim 13, wherein the impact modifier is present in amount from about 1% to about 15% by weight based on the total weight of the entire composition.

15. The composition of claim 14, wherein the impact modifier comprises a block copolymer of alkenyl aromatic compounds and dienes.

16. The composition according to claim 1, further comprising a flow promoter.

17. The composition according to claim 16, wherein the flow promotor is present in an amount from about 1% to about 20% by weight based on the total weight of the entire composition.

18. The composition according to claim 17, wherein the flow promotor is selected from the group consisting of polystyrene and high impact polystyrene.

19. The composition of claim 18, wherein the poly (phenylene ether) resin comprises a compatibilizing poly (phenylene ether) resin.

20. The composition of claim 1, wherein the partially fluorinated polyolefin resin comprises a copolymer of 1-propene, 1,1,2,3,3,3-hexafluoropolymer with 1,1-difluoroethane.

21. The composition of claim 1, wherein the beard growth reducing agent is a copolymer of 1-propene, 1,1,2,3,3,3-hexafluoropolymer with 1,1-difluoroethane.

22. A composition consisting essentially of:
(a) a poly(phenylene ether) resin;
(b) a polyamide resin; and
(c) an amount of a beard growth reducing agent selected from the group consisting of partially fluorinated polyolefin resins, and mixtures of non-elastomeric polyolefin resins and partially fluorinated polyolefin resins, effective for inhibiting beard growth, wherein the amount of partially fluorinated polyolefin resins is between about 200 and 1000 ppm based on the total weight of the composition and the amount of non-elastomeric polyolefin resins is between about 0% to about 5% based on the total weight of the composition.

23. The composition of claim 22, wherein the beard growth reducing agent is a copolymer of 1-propene, 1,1,2,3,3,3-hexafluoropolymer with 1,1-difluoroethane.

24. The composition of claim 22 wherein the partially fluorinated polyolefin resin comprises a copolymer of 1-propene, 1,1,2,3,3,3-hexafluoropolymer with 1,1-difluoroethane.

25. A method for making a composition comprising:
intimately admixing a poly(phenylene ether) resin, a polyamide resin, and an amount of a beard growth reducing agent selected from the group consisting of partially fluorinated polyolefin resins, and mixtures of non-elastomeric polyolefin resins and partially fluorinated polyolefin resins, effective for inhibiting beard growth, wherein the amount of partially fluorinated polyolefin resins is between about 200 and 1000 ppm based on the total weight of the composition and the amount of non-elastomeric polyolefin resins is between about 0% to about 5% based oh the total weight of the composition.

26. The method of claim 25, wherein the partially fluorinated polyolefin resin comprises a copolymer of 1-propene, 1,1,2,3,3,3-hexafluoropolymer with 1,1-difluoroethane.

27. An article of manufacture made from a composition comprising:
(a) a poly(phenylene ether) resin;
(b) a polyamide resin; and
(c) an amount of a beard growth reducing agent selected from the group consisting of partially fluorinated polyolefin resins, and mixtures of non-elastomeric polyolefin resins and partially fluorinated polyolefin resins, effective for inhibiting beard growth, wherein the amount of partially fluorinated polyolefin resins is between about 200 and 1000 ppm based on the total weight of the composition and the amount of non-elastomeric polyolefin resins is between about 0% to about 5% based on the total weight of the composition.

28. The article of claim 27, wherein the partially fluorinated polyolefin resin comprises a copolymer of 1-propene, 1,1,2,3,3,3-hexafluoropolymer with 1,1-difluoroethane.

* * * * *

UNITED STATES PATENT AND TRADEMARK OFFICE
CERTIFICATE OF CORRECTION

PATENT NO. : 5,760,132
DATED : June 2, 1998
INVENTOR(S) : Neil Andrew McGaughan, et. al.

It is certified that error appears in the above-identified patent and that said Letters Patent is hereby corrected as shown below:

Title page, item [75], the name of the third inventor should read-- Ronald J. Wroczynski --.

Signed and Sealed this

Twentieth Day of October, 1998

*Attest:*

BRUCE LEHMAN

*Attesting Officer*         *Commissioner of Patents and Trademarks*